US007151672B2

(12) United States Patent
Campbell

(10) Patent No.: US 7,151,672 B2
(45) Date of Patent: Dec. 19, 2006

(54) COMPUTER HOUSING WITH REMOVABLE AESTHETIC OUTER SHELLS

(75) Inventor: Adam Campbell, 14-82 212th st., Bayside, NY (US) 11360

(73) Assignee: Adam Campbell, Queens, NY (US)

( * ) Notice: Subject to any disclaimer, the term of this patent is extended or adjusted under 35 U.S.C. 154(b) by 79 days.

(21) Appl. No.: 10/907,213

(22) Filed: Mar. 24, 2005

(65) Prior Publication Data

US 2006/0215358 A1  Sep. 28, 2006

(51) Int. Cl.
*G06F 1/16* (2006.01)

(52) U.S. Cl. .................. 361/725; 361/683; 174/50.51; 312/223.2

(58) Field of Classification Search ............... 361/725; 174/50.51
See application file for complete search history.

(56) References Cited

U.S. PATENT DOCUMENTS

| 3,349,289 | A | * | 10/1967 | Mueller | 361/731 |
| 4,728,160 | A | * | 3/1988 | Mondor et al. | 312/236 |
| 5,745,566 | A | | 4/1998 | Petrella | 379/433.13 |
| 5,774,330 | A | * | 6/1998 | Melton et al. | 361/683 |
| 5,941,617 | A | | 8/1999 | Crane, Jr. | 312/204 |
| 5,967,633 | A | | 10/1999 | Jung | 312/223.2 |
| 6,220,680 | B1 | | 4/2001 | Chen | 312/233.2 |
| 6,288,329 | B1 | * | 9/2001 | Kopp et al. | 174/378 |
| 6,297,948 | B1 | * | 10/2001 | Buican et al. | 361/683 |
| 6,545,874 | B1 | | 4/2003 | Miller | 361/752 |
| 6,870,739 | B1 | * | 3/2005 | Groos et al. | 361/725 |
| 6,946,602 | B1 | * | 9/2005 | Gibbs et al. | 174/560 |
| 2006/0164798 | A1 | * | 7/2006 | Zheng | 361/679 |

* cited by examiner

*Primary Examiner*—Lynn Feild
*Assistant Examiner*—Anthony Q. Edwards

(57) ABSTRACT

The present invention discloses a computer housing with specially shaped sides and removably attached aesthetic outer shells. The housing is formed of five sides where by four of them come together to form a sixth side, having at least one of these four sides hinged too open to reveal the interior of the computer housing. The housing is fastened to a base panel of an aesthetic outer shell where a top half section attaches itself to a base panel, concealing the housing.

13 Claims, 23 Drawing Sheets

FIG. 11
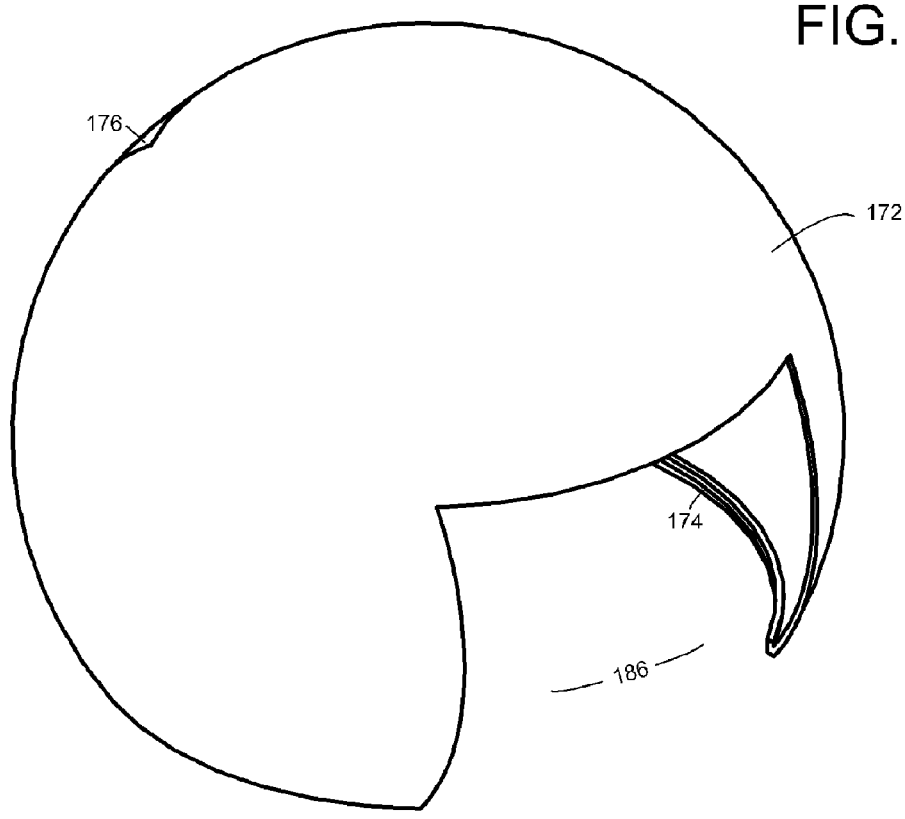
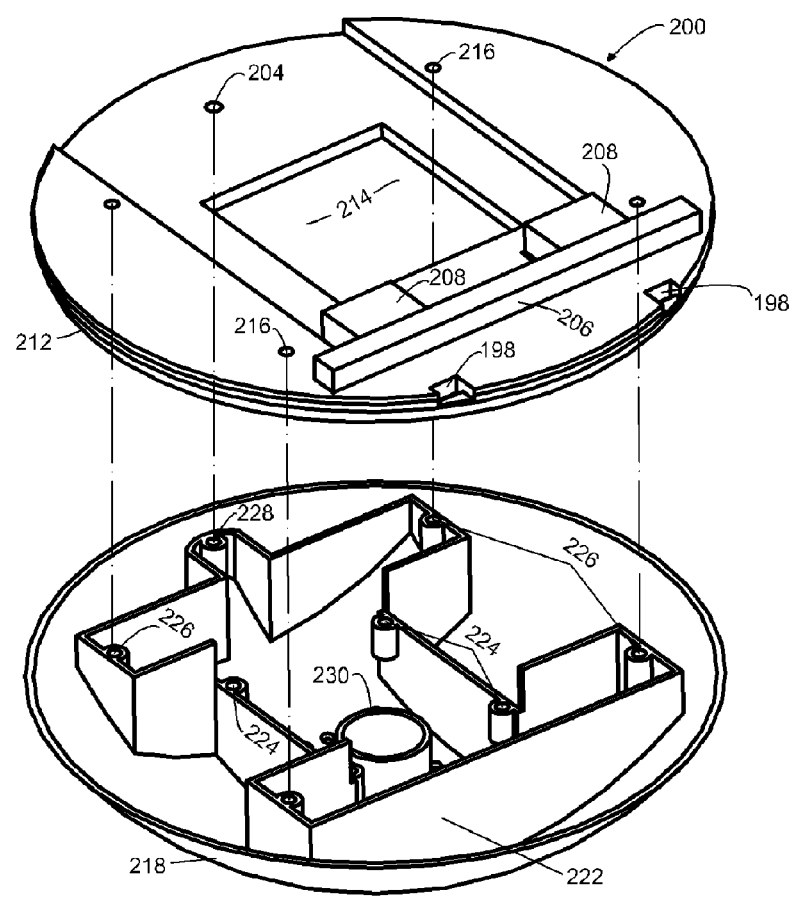

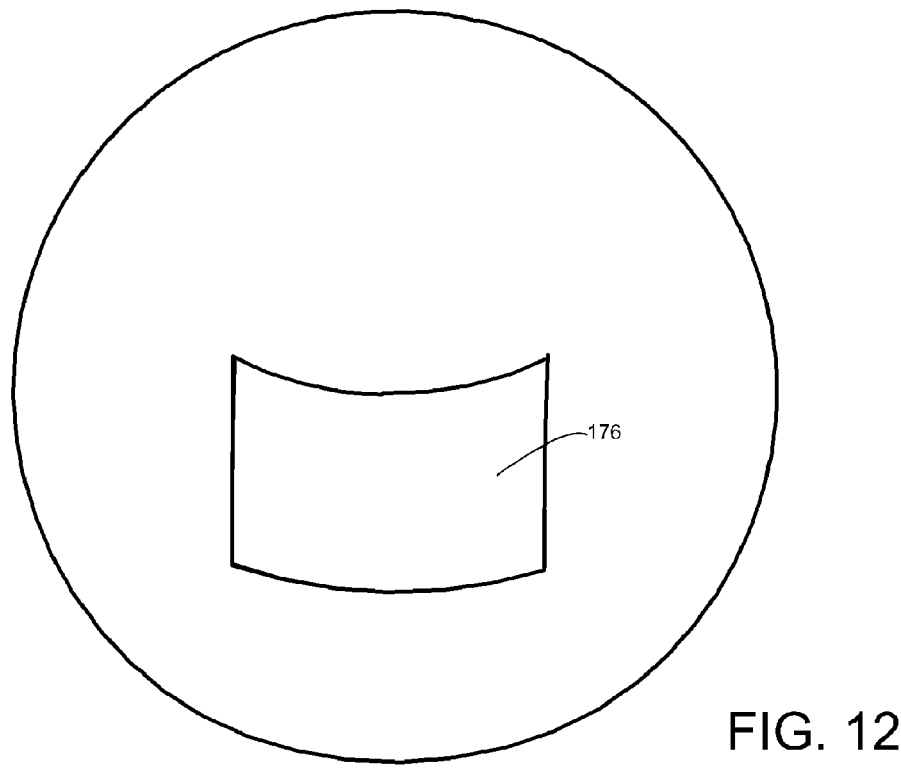
FIG. 12
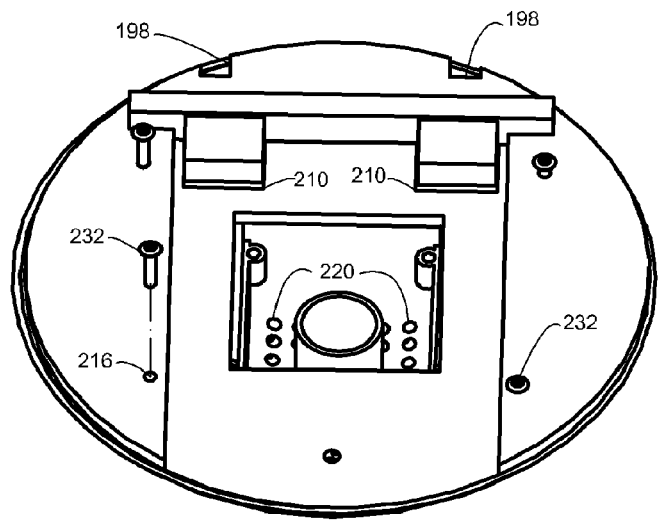
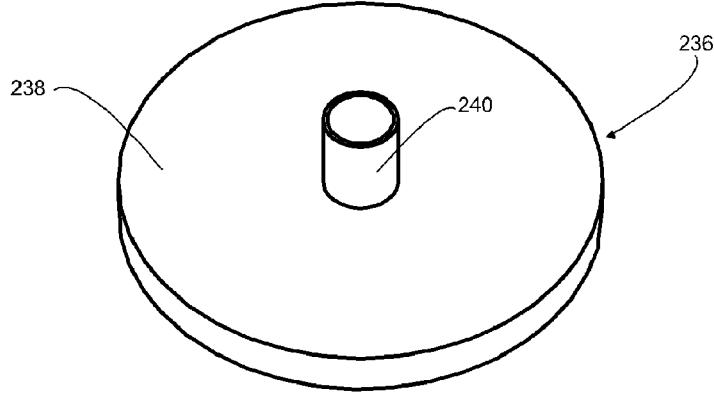

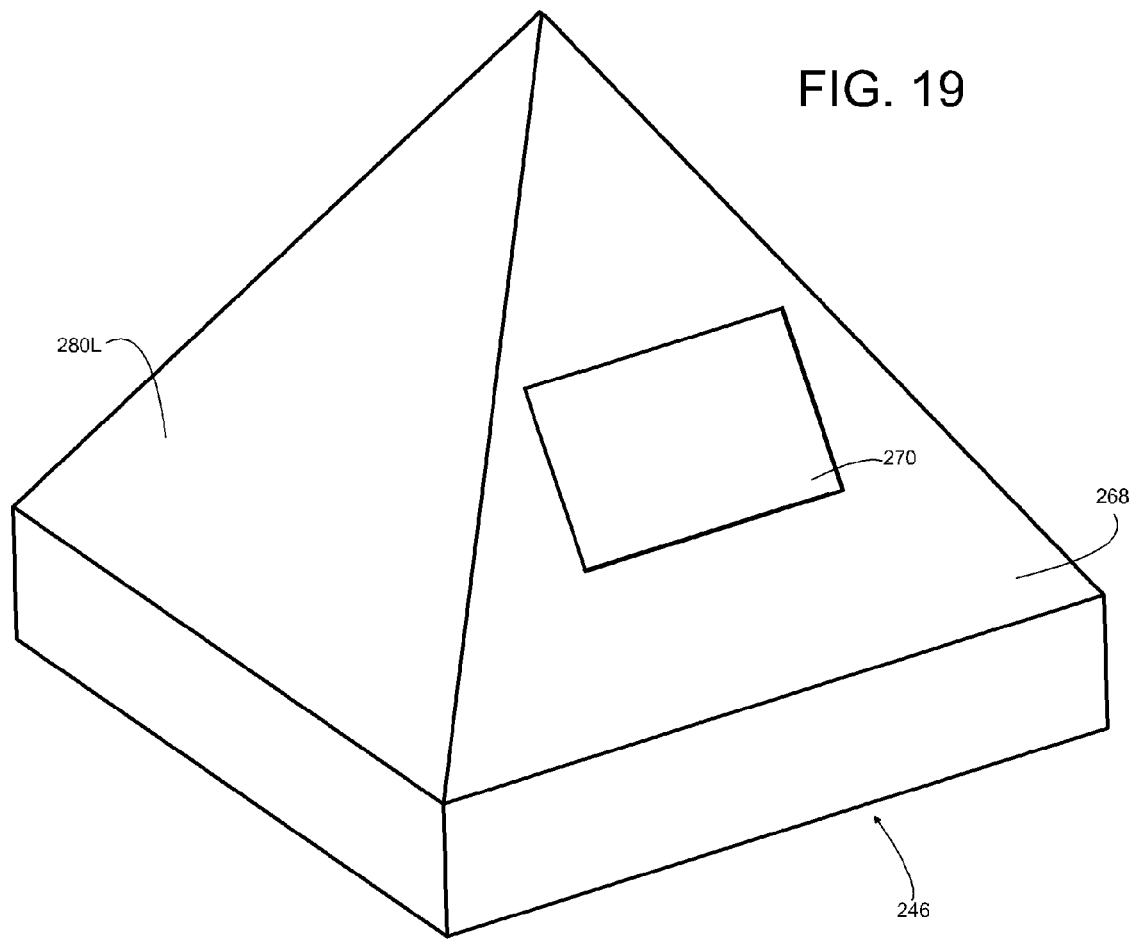
FIG. 19
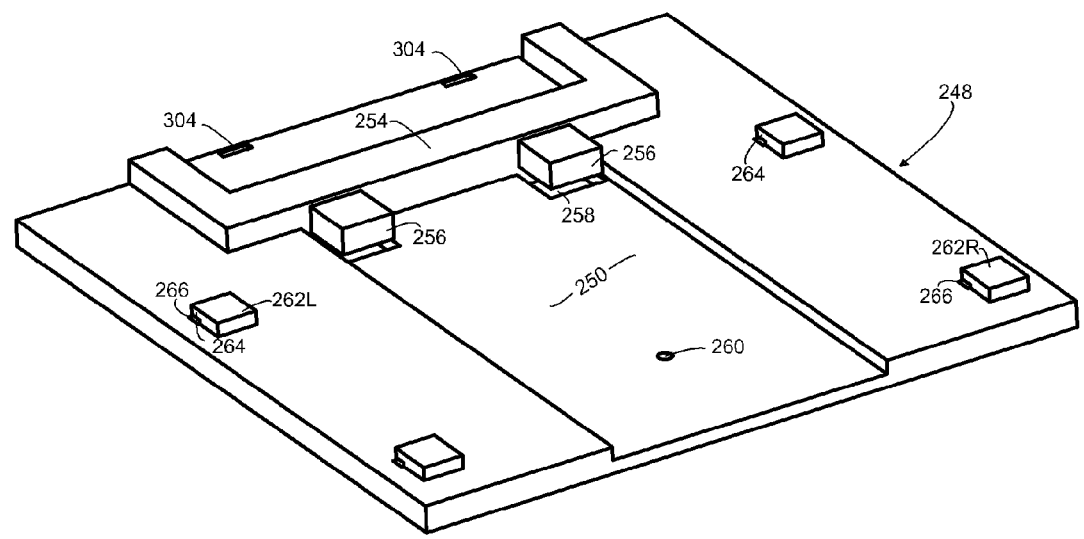

COMPUTER HOUSING WITH REMOVABLE AESTHETIC OUTER SHELLS

BACKGROUND OF THE INVENTION

Most personal computers in use today consist of a housing and panels that fasten directly to all sides of the housing. Once a personal computer is selected it limits the consumer to a single designated design, with perhaps the ability to change the front bezel and or its sides with removable square colored panels.

A process called modding can change the look of the computer; this is a way of altering the appearance of a standard computer case by make minor alterations and additions such as adding lights and cutting designs into the computer case. This leaves the original and usual tower and box shape remaining. So many have begun installing computer components into miscellaneous objects or creating ones from scratch. This is extremely time consuming and makes the ability to sell in quantity almost impossible. For the normal computer user such work is unfeasible not only because of the time but the need to possess and be familiar with certain tools. Leaving no choice but to purchase a standard computer case and/or computer from a manufacturer. The personal computer cases form also has an affect on the installation of components.

In a typical case design the installation of components are usually difficult because of cramped areas leaving little mobility of ones hands. As the cases form factor gets smaller the more difficult it gets. Advances to computer cases have been made, by allowing movable motherboard trays, a swing out side panel, and removable one-piece three sided tops.

The limitations with these are that in order to remove a fully assembled motherboard tray one has to remove the wires that are attached to the motherboard. While a swing out side panel allows for greater mobility it still leaves some area components confined. One piece three sided tops many times requires a multitude of screws that are attached to the housing. Even once it is removed it still leaves access to the computer components cramped because of the traditional unmovable four pillar housing structure.

It would be desirable for all users to be able to have a computer where it is not only easy to install components, but to allow them to directly effect the shape, not just the color. Transforming it into something that looks more like decorative art than a computer.

SUMMARY OF THE INVENTION

The invention, an improved computer case, is a uniquely shaped housing structure with multi-angled walls that fasten to separate removable outer shells without the use of tools.

BRIEF DESCRIPTION OF DRAWINGS

Figures

FIG. 11 is a perspective view from the back of the left side of an exploded sphere shell FIG. 12 is a perspective front view of the exploded sphere shell with the bottom half and base fastened, as well as a separate stand.

FIG. 19 is a perspective view of an exploded pyramid shell.

DETAILED DESCRIPTION OF THE PREFERRED EMBODIMENT

"This application claims the benefit of U.S. Provisional Application 60/557,445, filed 032904."

The casing for this personal computer includes a housing with completely separate interchangeable aesthetic outer shells.

Figure 1:
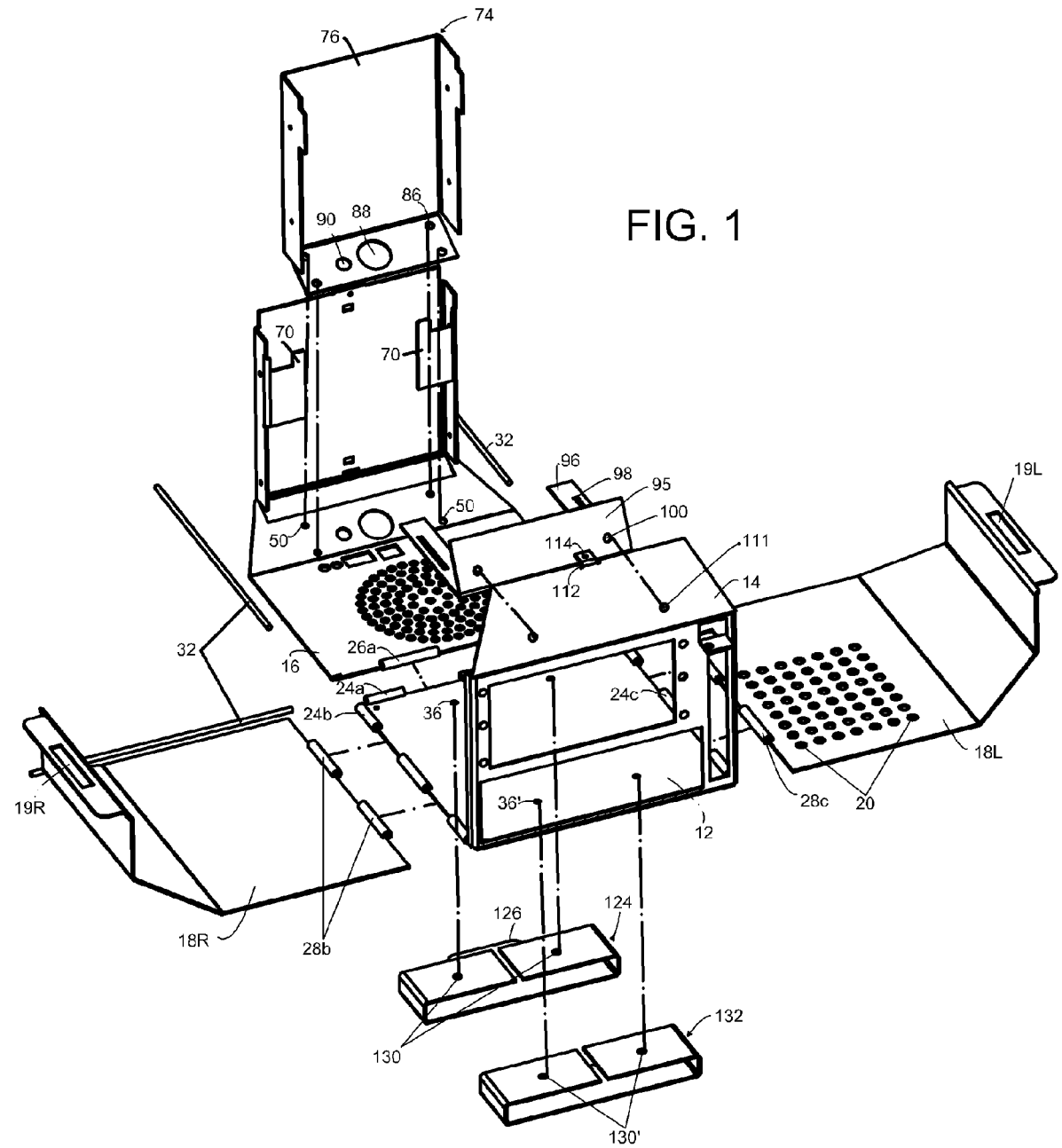
FIG. 1 is an exploded view of a personal computer housing.

Depicted in FIG. 1 is the exploded view of a housing 10. The housing 10 can be formed of any suitable material, e.g., plastic and metal, but preferably is formed of bent sheet metal. Housing 10 includes a bottom wall 12 which has one side bent upwardly to form a rear wall 14. Housing 10 further includes a front wall 16 and two opposite lateral side walls 18L and 18R.

Figure 3:
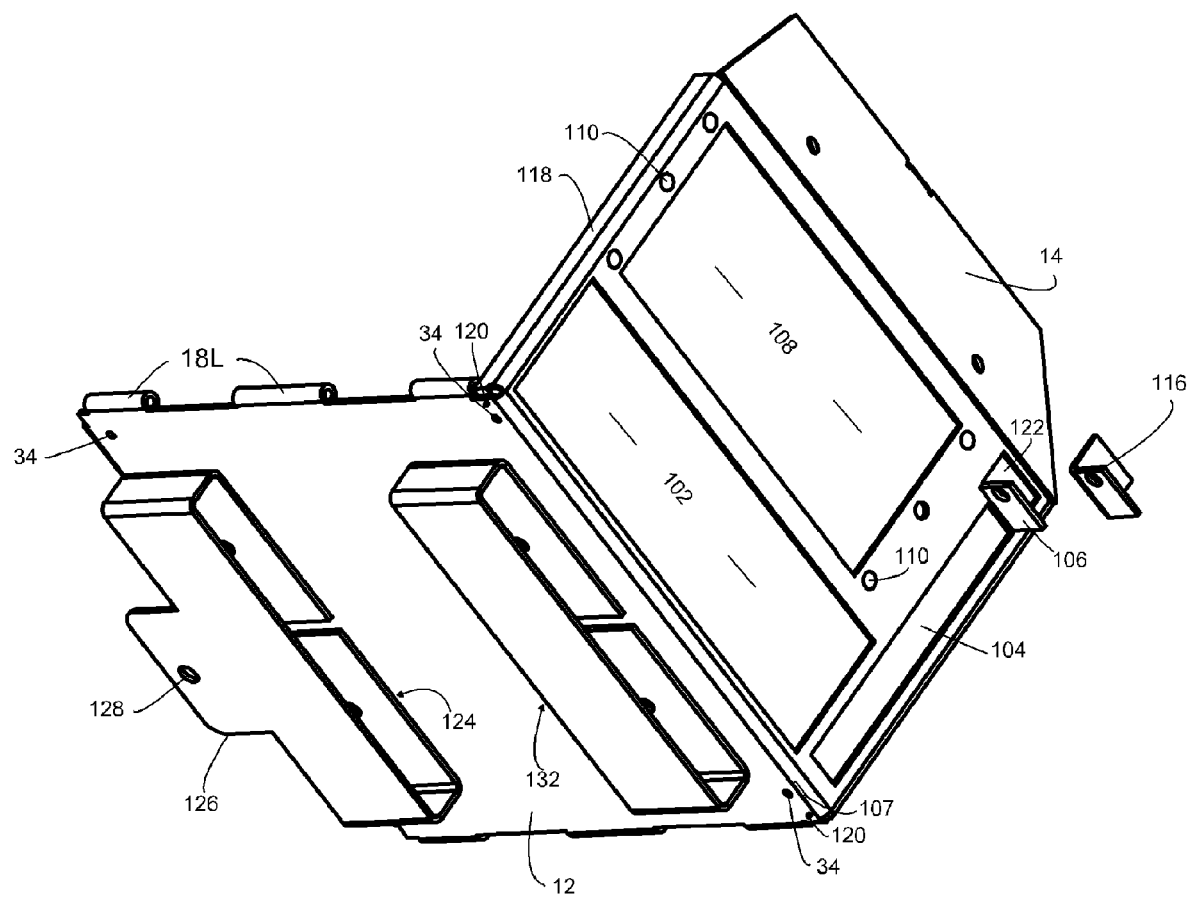
FIG. 3 is the underside view of the housing with brackets attached.

Bottom wall 12 has three hinge halves 24a, 24b and 24c. Front wall 16 with a hinge half 26a and the two opposite lateral side walls 18R and 18L with their respective hinge halves 28b and 28c, attach to bottom wall 12 hinge halves 24a, 24b and 24c with hinge pins 32. These form complete working hinges, which will be now referred to as 30a, 30b, and 30c. Bottom wall 12 has risers with mounting holes 34 for motherboard on top, rear wall support holes 35 and rectangular bracket mounting holes 36 and 36' on bottom (see FIGS. 1 and 3).

Figure 9:
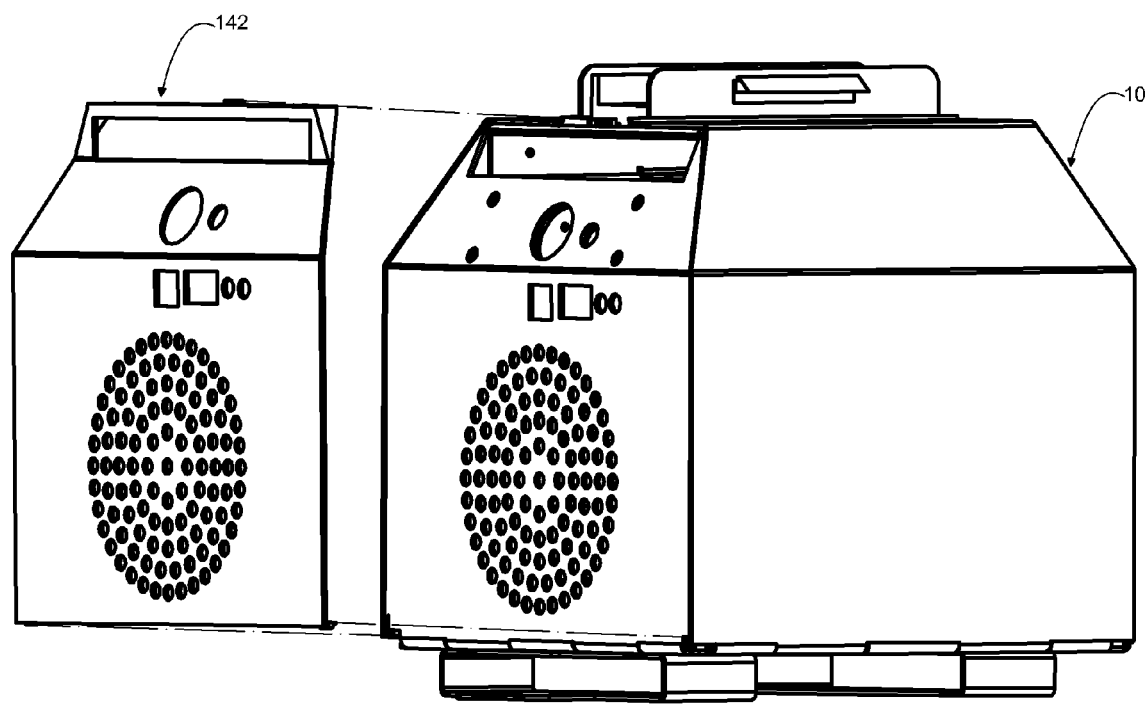
FIG. 9 shows a perspective view of a closed housing with exploded face covering.
Figure 10:
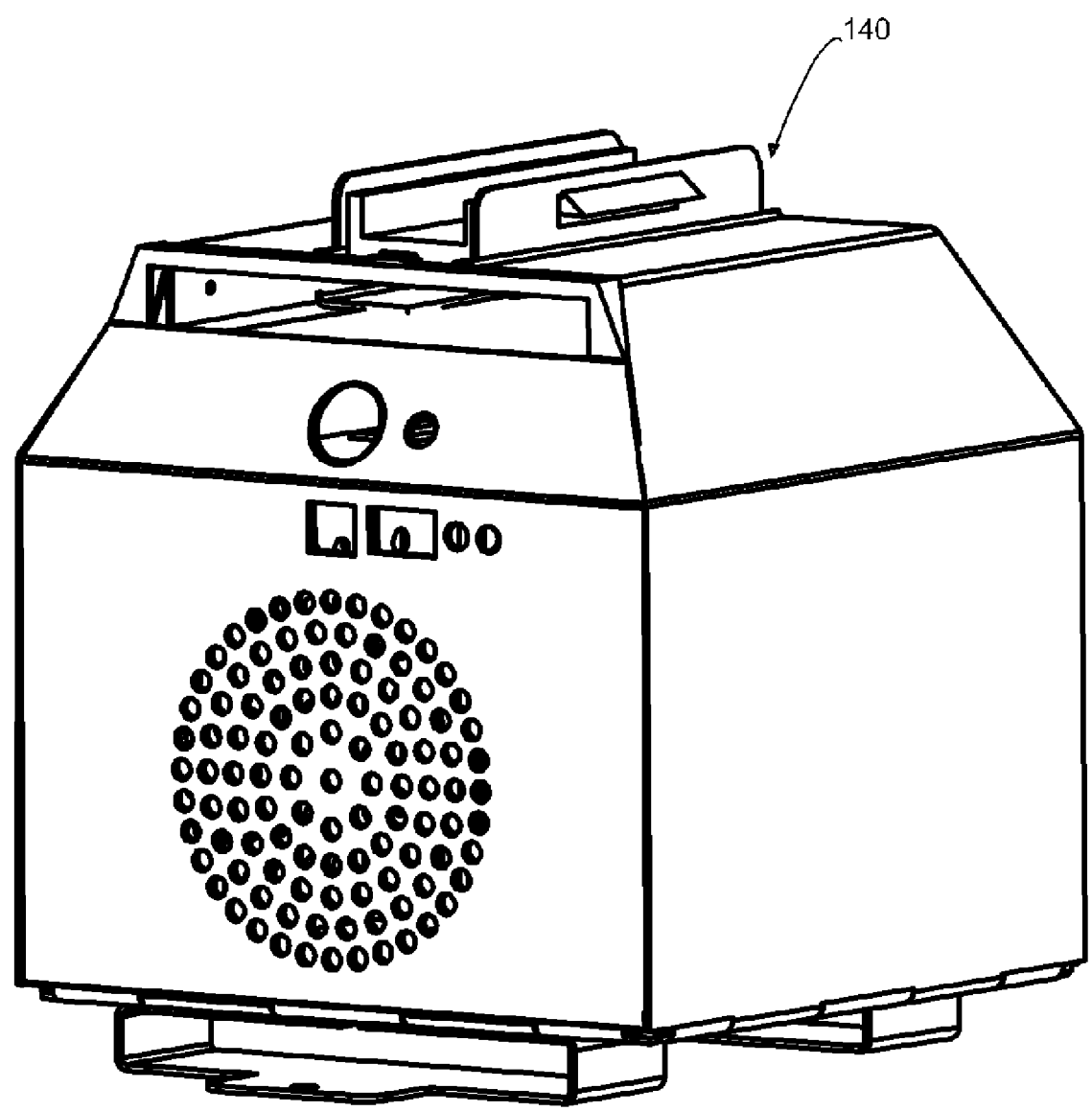
FIG. 10 shows a perspective view of the complete housing with attached face.
Figure 13:
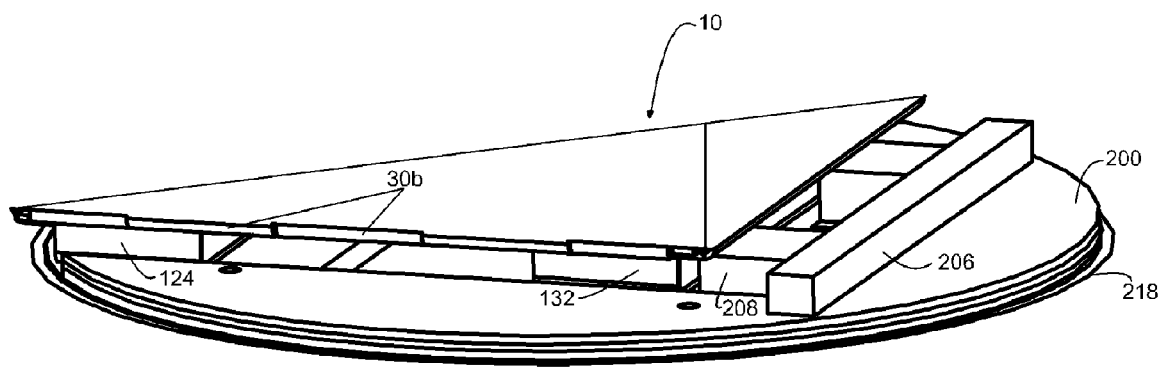
FIG. 13 is a close up view of the left side of the bottom of the sphere shell with the personal computer housing being slid into place.
Figure 14:
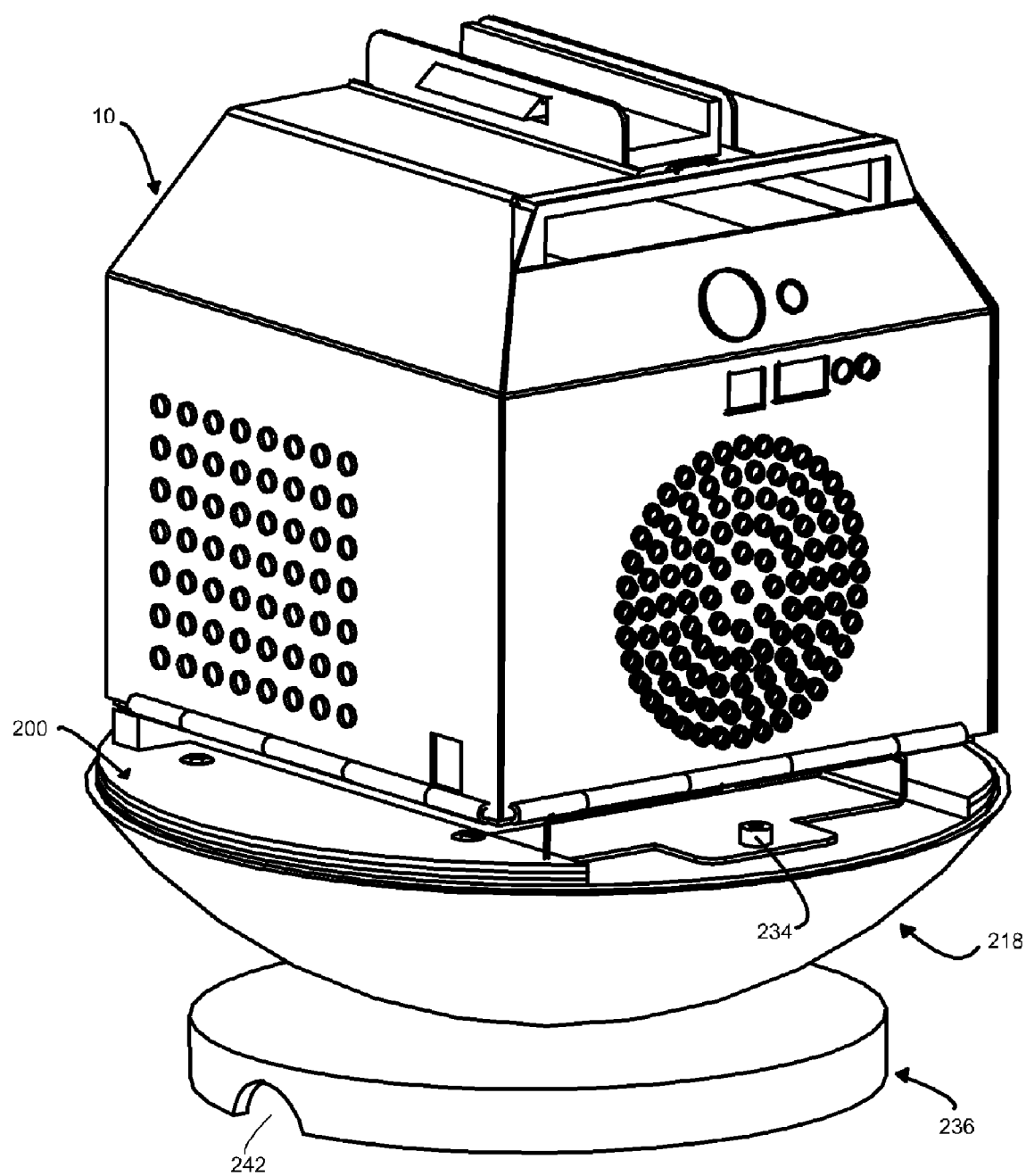
FIG. 14 is a prospective view of the housing fastened to the outer shell.
Figure 15:
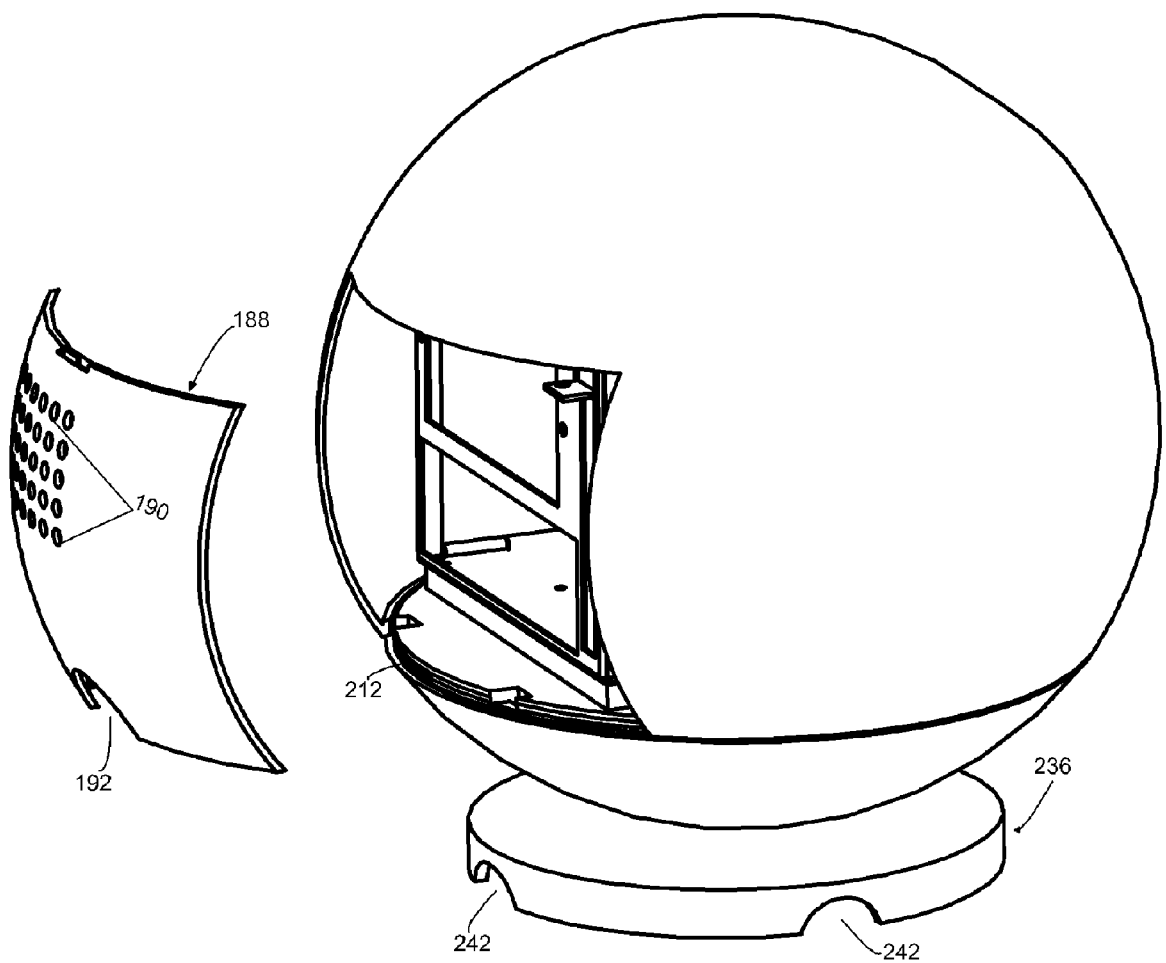
FIG. 15 is a rear view of the personal computer with unscrewed top and exploded rear panel.
Figure 16:
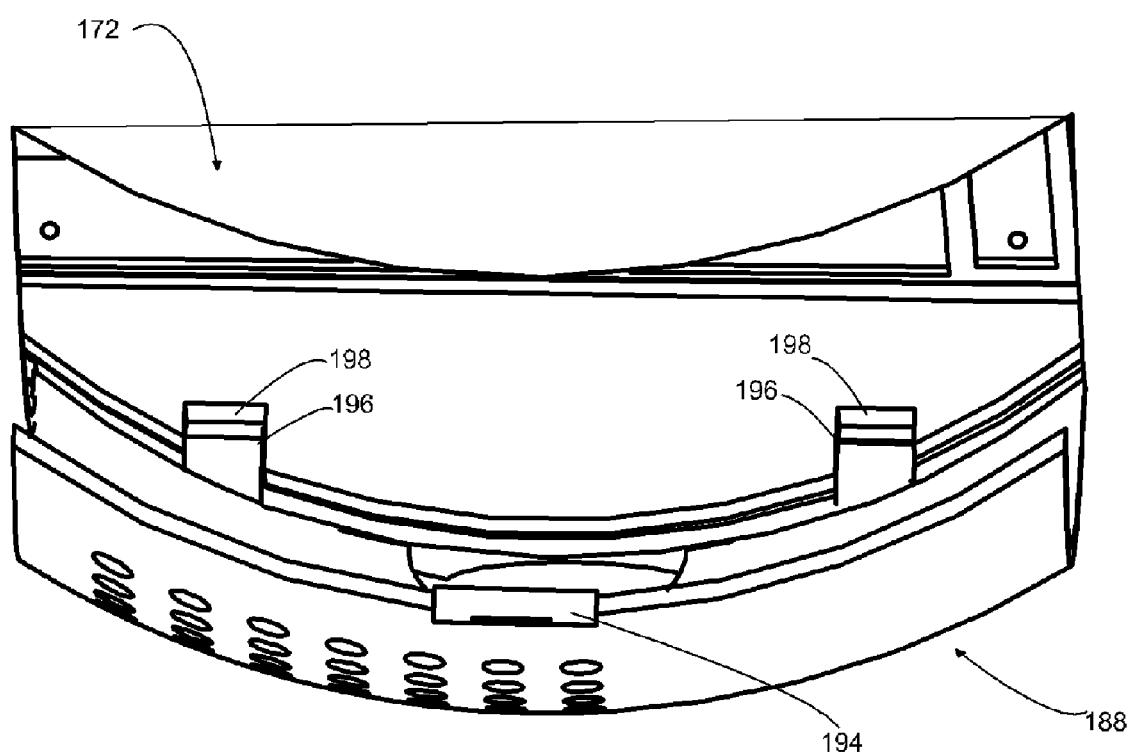
FIG. 16 is a close up view of the attaching of the rear panel.
Figure 17:
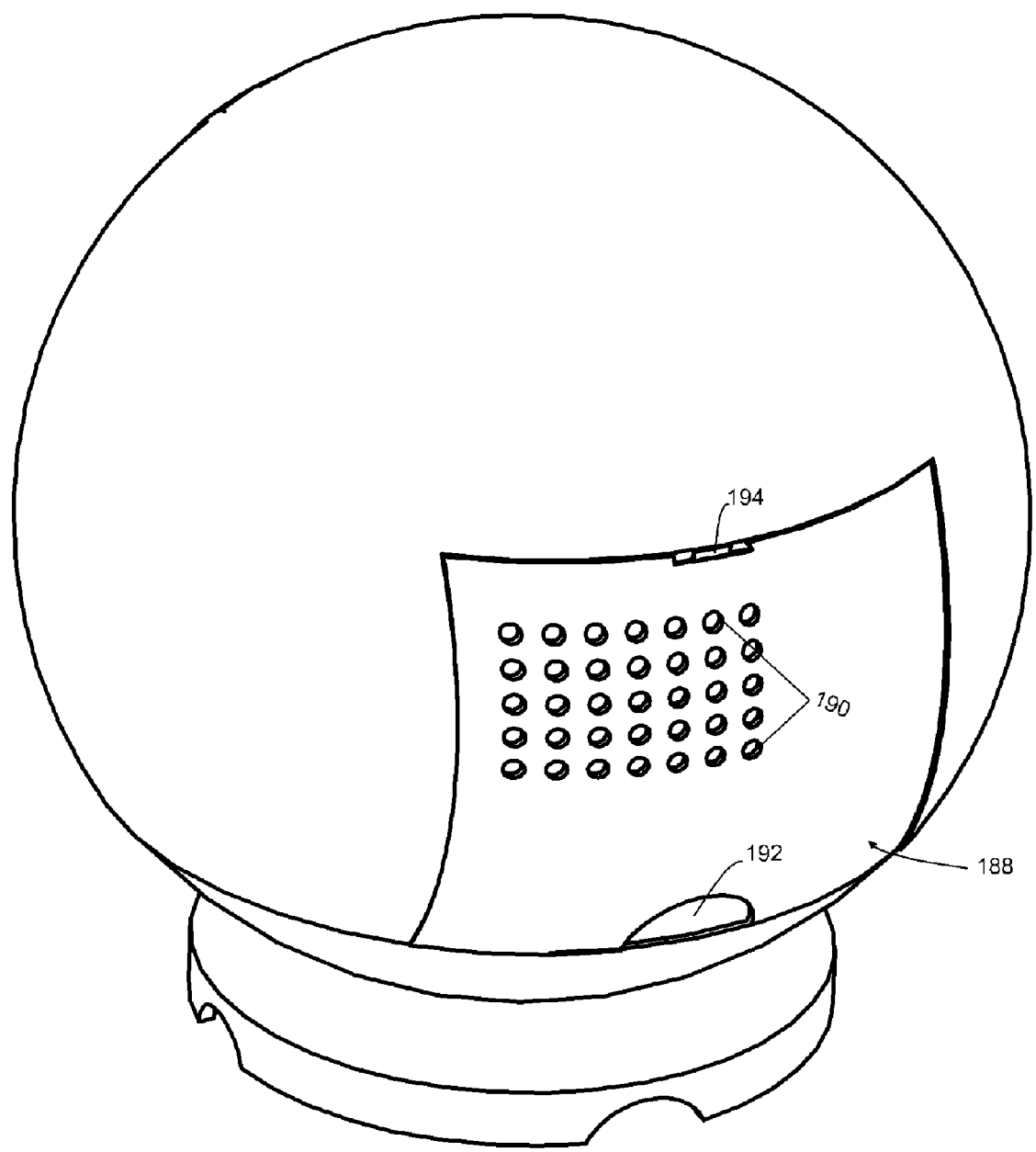
FIG. 17 is a rear view of a completely closed sphere shell in its stand.
Figure 18:
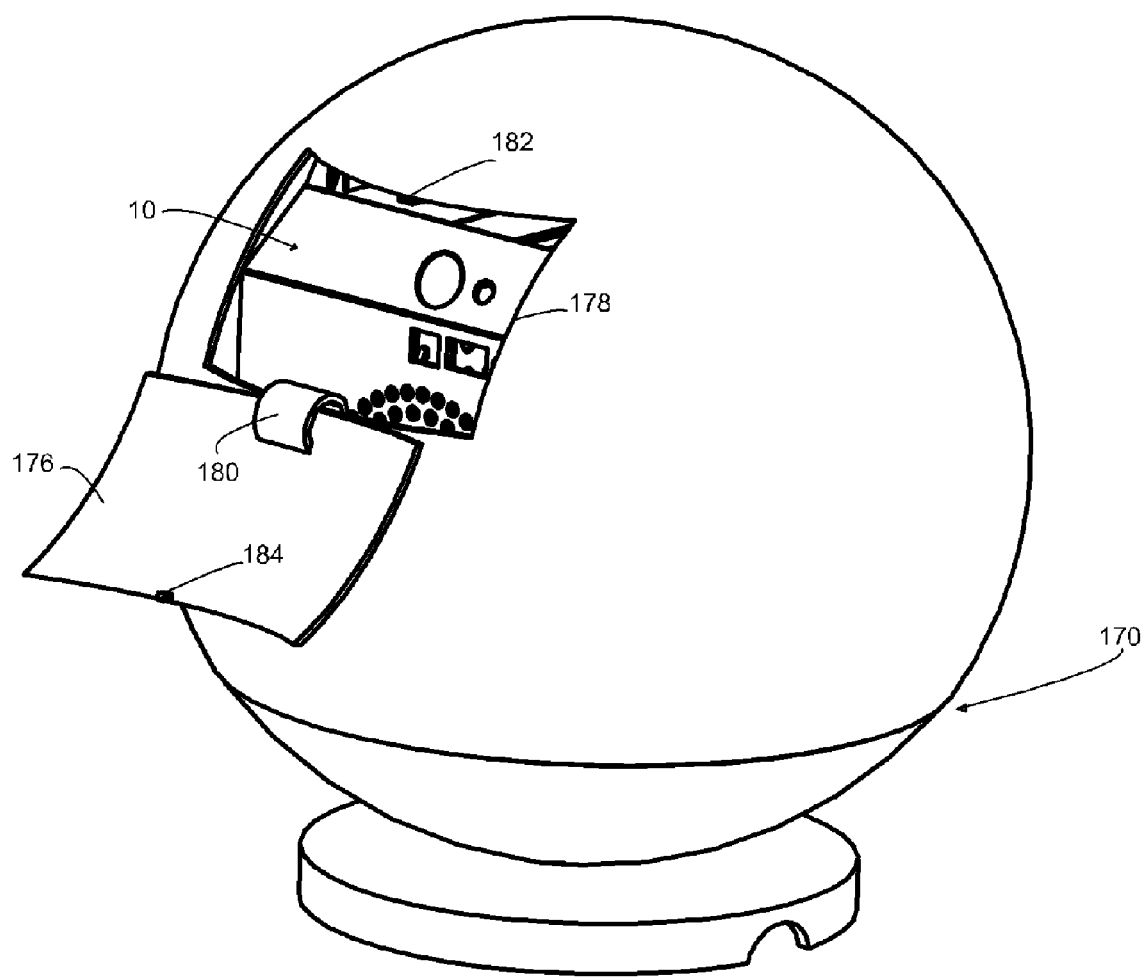
FIG. 18 is a perspective view of an opened hinge door of the sphere shell

Due to the shape of the case, the front wall 16 and the opposite lateral side walls 18L and 18R are cut and angled to form together with each other and the rear wall 14 of housing 10 when closed (see FIGS. 9 and 10). Front wall 16 and opposite lateral side walls 18L and 18R have tops that are bent over and become parallel to bottom wall 12 when closed forming a top wall 140 (see FIGS. 6 and 10).

Two slits 42 are placed along the bottom of either side of front wall 16. Front wall 16 has apertures for drive bays 40, power button control 52 and reset button control 54, ventilation holes 38, front USB ports 56, Firewire port 58, and front audio ports 60. Mounting plate holes 50 are placed below drive bay 40 (see FIGS. 4 and 7).

The parallel bend of front wall 16 forms a top plate for a slimline drive 66. Placed along the top of slimline drive 66 are locking mechanism flanges 46, a face flange 44 and a thumbscrew hole 48 to fasten to rear wall 14. Each of the two opposite lateral side walls 18L and 18R parallel bends are bent and cut to create apertures 19L and 19R on their respective tops (see FIGS. 1, 4 and 6). Side wall 18L has ventilation holes 20 and a fan cable aperture 22.

Figure 2:
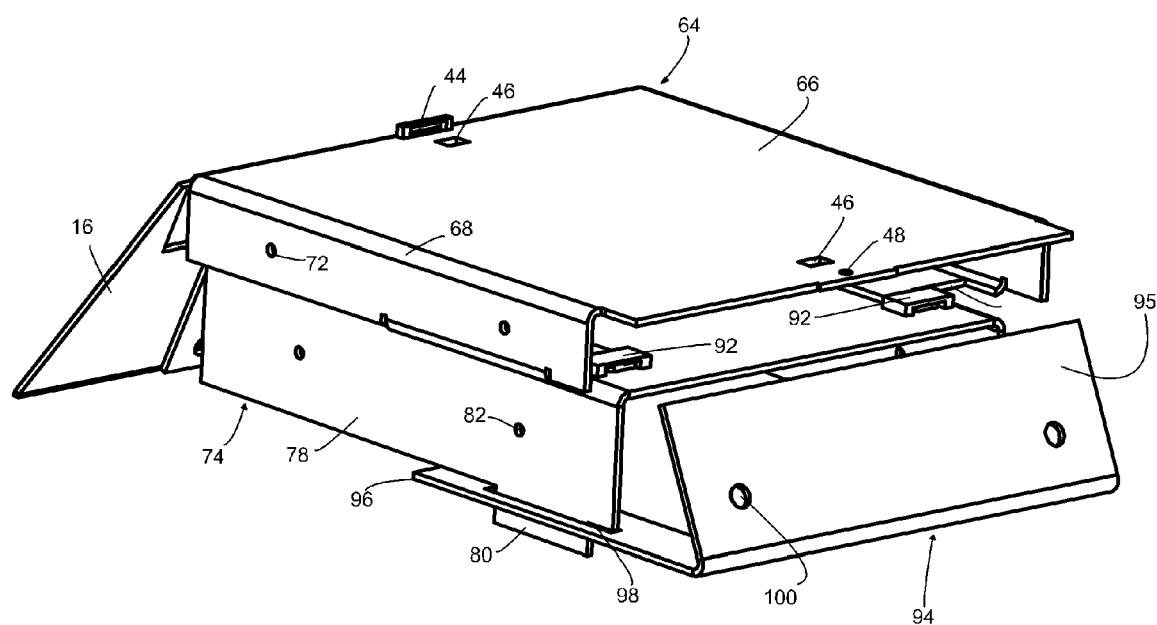
FIG. 2 is a close up view of the disk drive assembly.

In (FIGS. 1, 2, and 3) a drive support bracket 94 with a set of elongated supports 96 and slits 98 are secured to support holes 111 of rear wall 14 by affixing elongated support mounting plate 95 with fastening holes 100 by way of fasteners such as rivets. Rear wall 14 has support walls 118 that are bent perpendicular to itself and are fastened to bottom wall holes 35 with fasteners 62 such as rivots at support holes 120. Rear wall 14 has apertures for motherboard peripheral faceplate 102, an expansion card slot 104, expansion card support 106, an aperture for power supply 108 with mounting holes 110, a PCI cover 116 and a flange 112 with thumbscrew hole 114 for front wall 16 to fasten too.

A rectangular bracket 124 has an extended bottom 126 that is past the front of housing 10. A fastening hole 128 is placed through the extended bottom 126 for the use of a fastener such as thumbscrews 160 (see FIGS. 1, 3, and 10). Rectangular metal bracket 124 is fastened with holes 130 to the front of bottom wall 12 through the top of mounting holes 36. A rectangular metal bracket 132 is fastened with holes 130' to the back of bottom wall 12 through the top of mounting holes 36' (see FIGS. 1 and 3).

In the preferred embodiment a hard drive bracket 74 and a slimline Cd-drive bracket 64 are used. The drive brackets in the preferred embodiment are made of sheet metal.

As shown in FIG. 1 hard drive bracket 74 has a top plate 76 that at its front is bent at a downward angle forming a mounting plate 84. Mounting plate 84 has four mounting holes 86, power button aperture 88, reset button apertures 90. Hard drive bracket 74 has a pair of downwardly bent sides 78 with tabs 80. Hard drive bracket 74 has side fastening holes 82 for drive installation. The top plate 76 of the hard drive bracket 74 has two flanges 92 on either side. Slimline Cd drive bracket 64 has a top plate 66 with two downwardly bending sides 68 that again bend to form supports 70 for hard drive bracket 74. Slimline Cd drive bracket 64 has side fastening holes 72 for drive installation.

The two flanges 92 on hard drive bracket 74 slide over slimline Cd supports 70. This puts the hard drive mounting plate 84 and power button aperture 88, reset button aperture 90 and hard drive mounting plate holes 86 inline with power button aperture 52, reset button aperture 54, and plate holes 50 of front wall 16. They are than secured to each other with fasteners 62 (see FIGS. 1 and 2).

Figure 4:
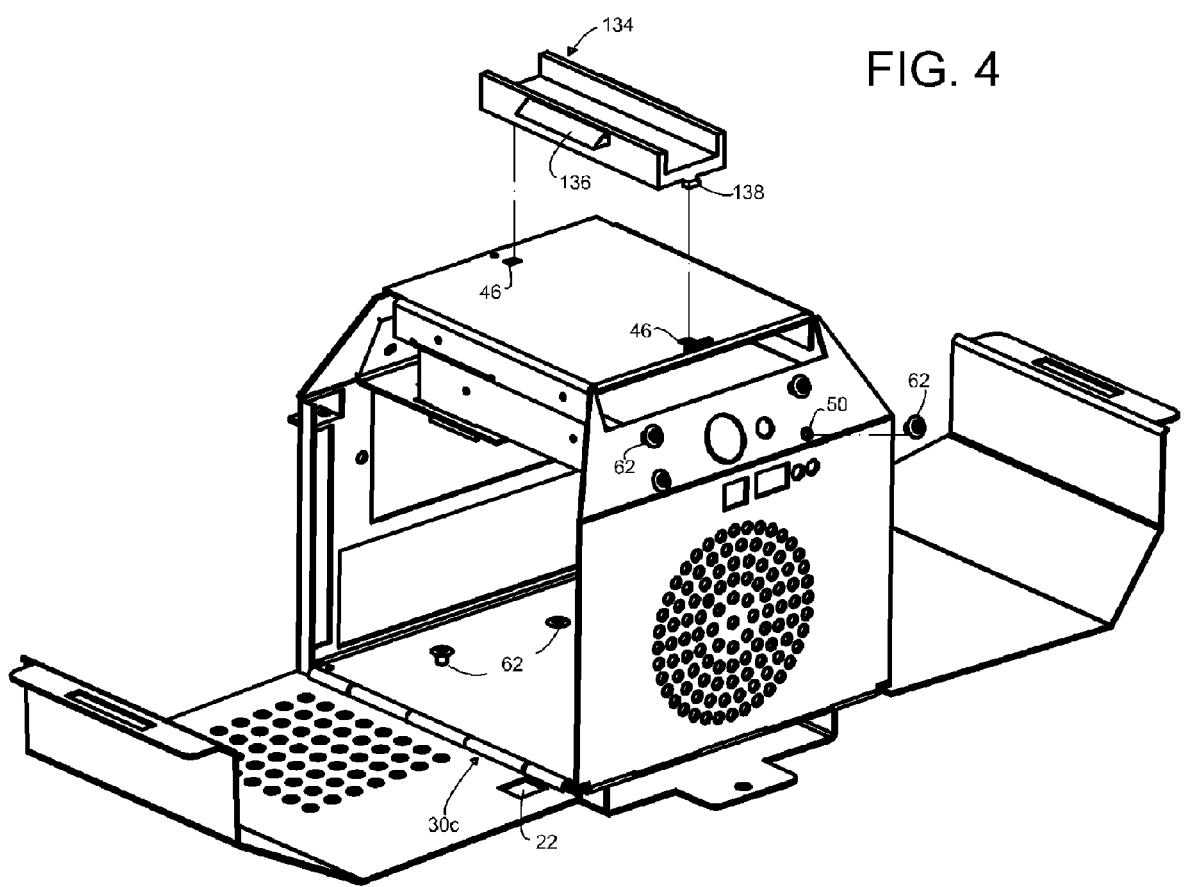
FIG. 4 is a perspective view of the housing with its front side in a closed position and its two sides folded open.
Figure 5:
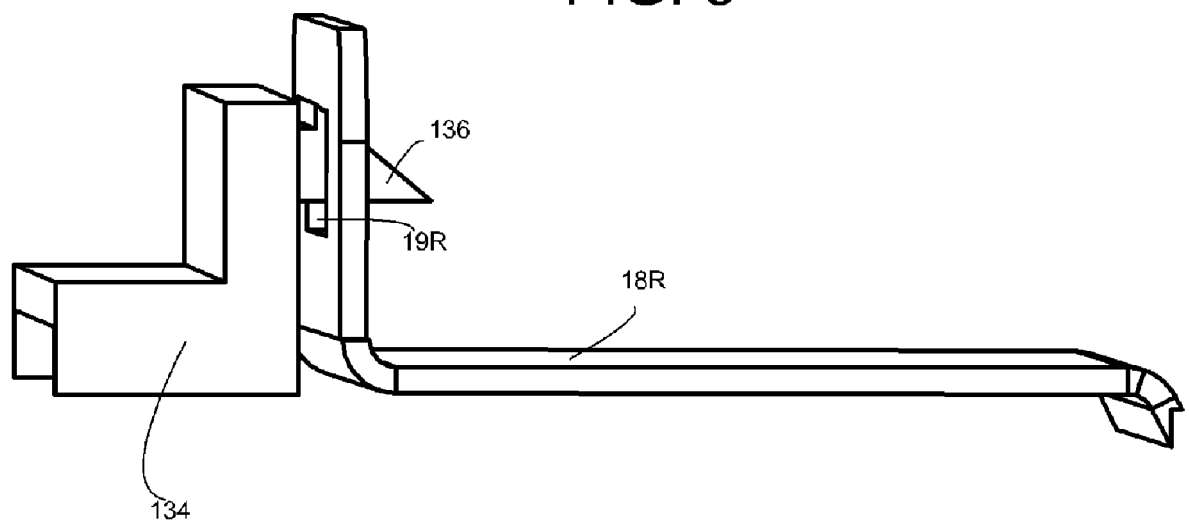
FIG. 5 is a close up view of the locking element and a side wall
Figure 6:
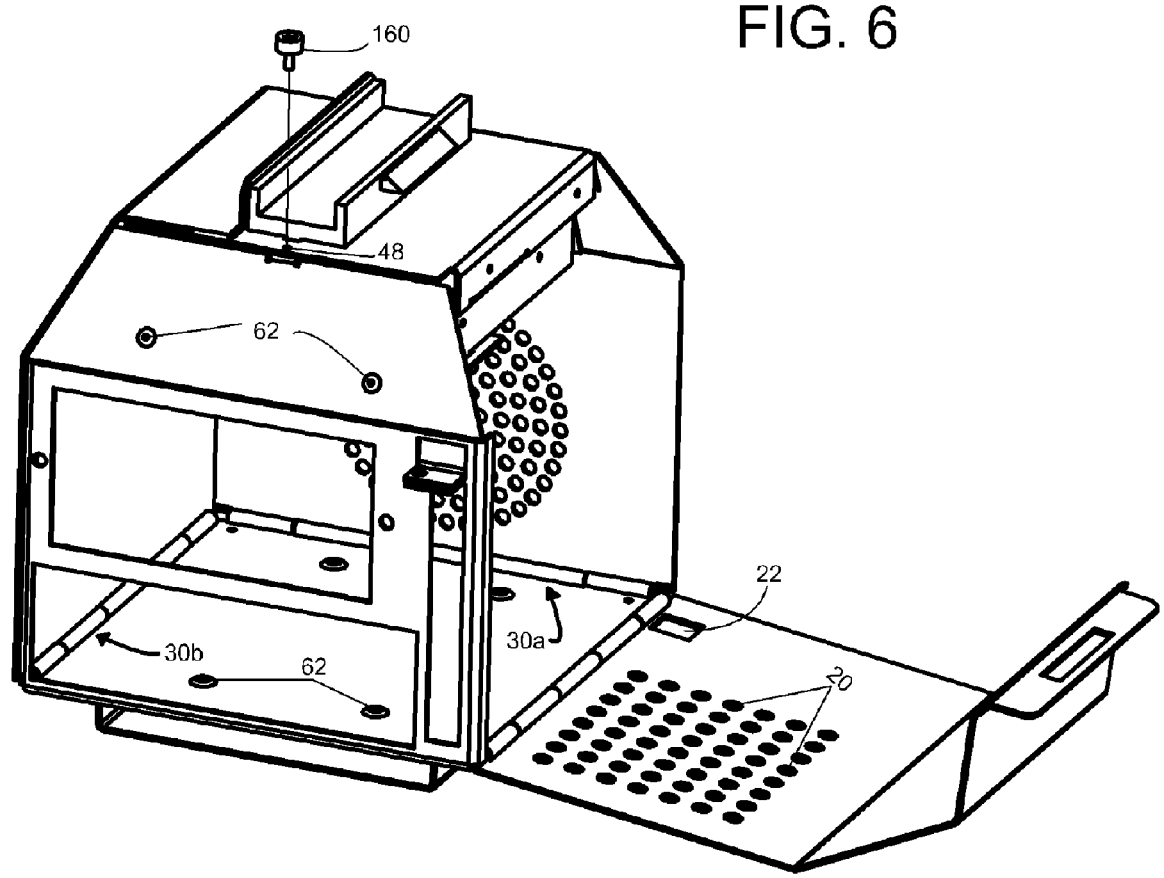
FIG. 6 shows a rear perspective view of housing with a locked in place right side and a folded open left side.

A locking mechanism 134 has flanges 138 that fasten at mortises 46 at top of front wall 16 (see FIGS. 4, 5 and 6). Locking mechanism 134 has side wall fastening tabs 136 for locking opposite lateral side walls 18L and 18R. In the preferred embodiment the locking mechanism is manufactured from injected molded plastic. The locking mechanism can be made of other suitable materials and take other forms.

Once assembled housing 10 is closed. The front wall 16 is folded up on hinge 30a to where a set of tab 80 of hard drive bracket 74 fit into elongated supports slits 98 of rear wall 14 (see FIGS. 2, 4 and 6). This allows all drive brackets to rest on the elongated metal bracket 94. The opposite lateral side walls 18L and 18R than fold up on their respective hinges 30b and 30c and connect to locking mechanism fastening tabs 136 with apertures 19L and 19R forming a top wall 140 (see FIGS. 5, 6, and 10). The elongated support bracket 94 and lateral side walls 18L and 18R act as a way for the case to distribute weight from front wall 16's drives to the rest of housing 10.

Figure 7:
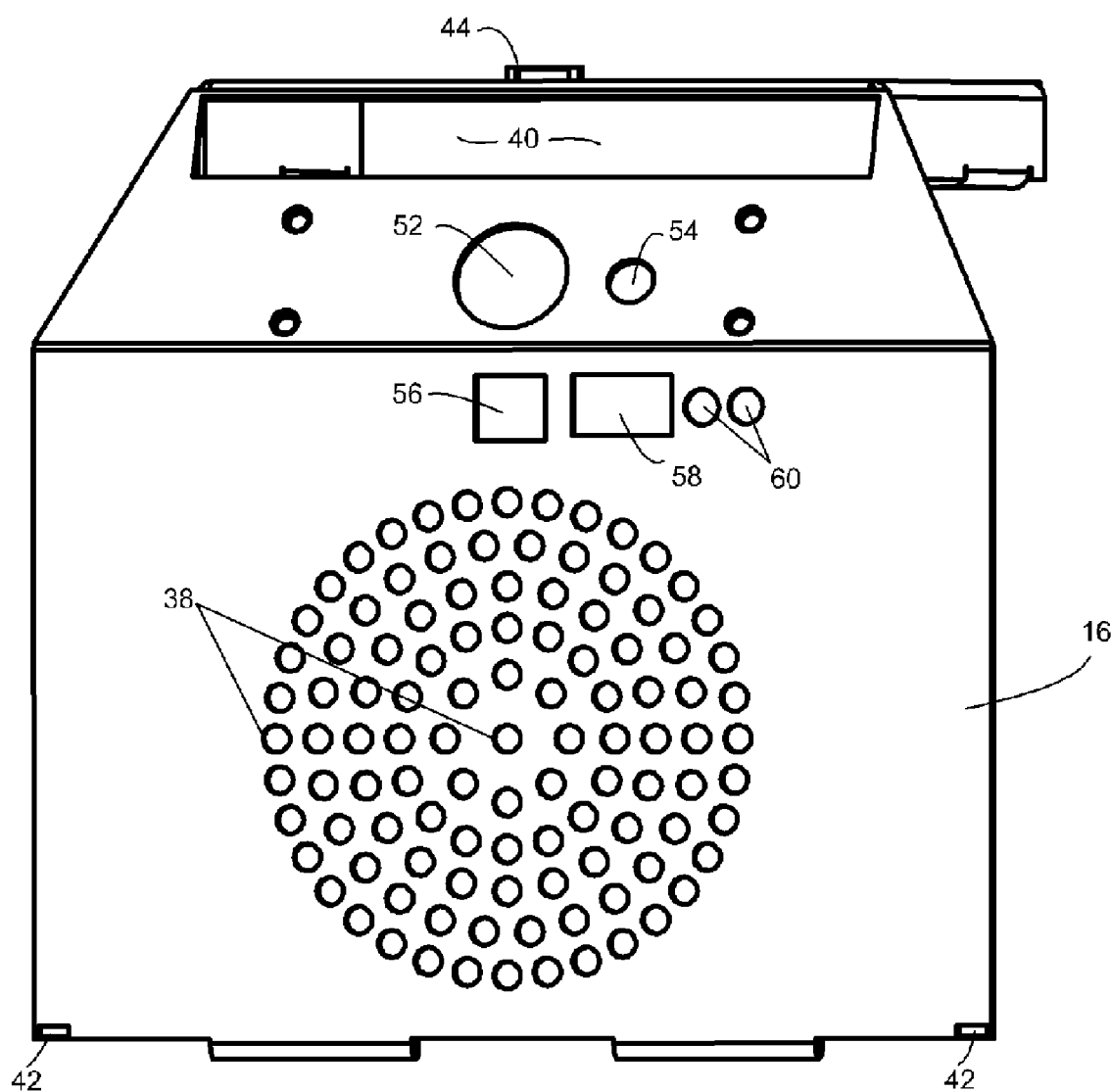
FIG. 7 is the front view of the housings front wall.
Figure 8:
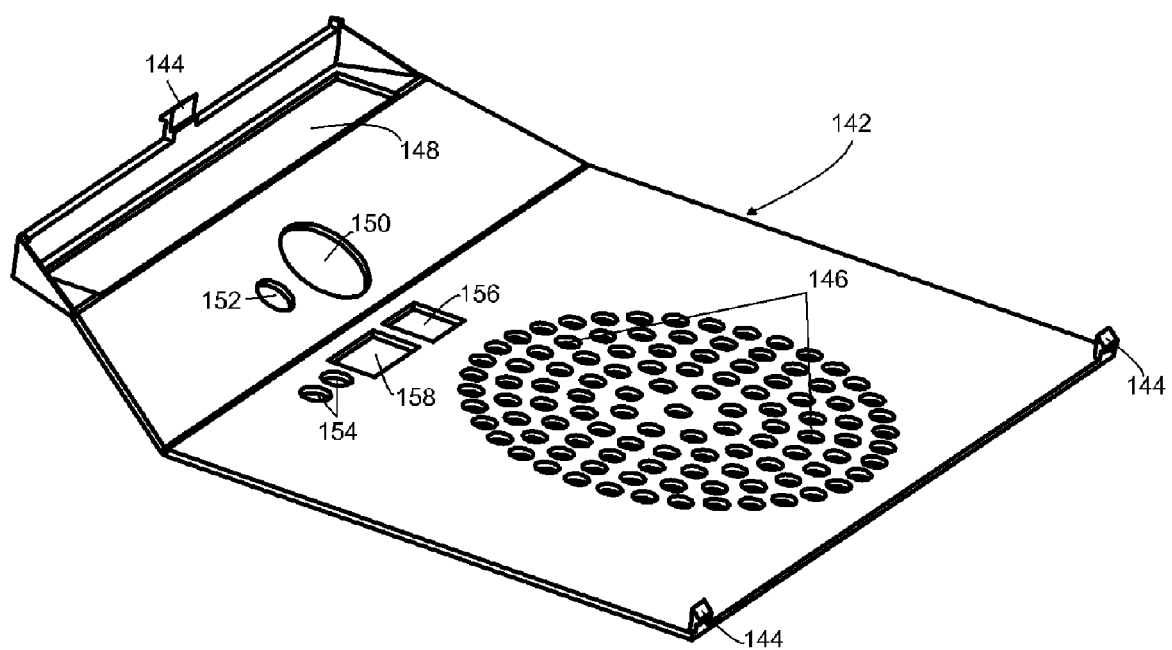
FIG. 8 is an inside top view of the face covering.

Once the housing is closed an optional plastic face 142 is attached by snapping face tabs 144 into place at slits 42 and flange 44 of front wall 16 (see FIGS. 7, 8 and 9). Plastic face 142 has ventilation holes 146 that line up with front wall 16 ventilation holes 38, cut out for power button 150, reset button 152, audio ports 154, USB port 156, firewire port 158 and drive aperture 148 (see FIGS. 8 and 9). Plastic face 142 is used to cover up fasteners and to give the front a more finished look.

While housing 10 maintains its unique form and function, its size however may vary depending on the computer hardware used. This will affect the size of the machine by limiting your ability to upgrade later or by creating a machine larger in size. As one can see countless combinations are possible.

Now that housing 10 is finished being assembled and closed it is than placed into an aesthetic outer shell (FIGS. 11–23) in so doing completing the personal computer case. The shells of said computer may be manufactured using cast metal, plastic, wood and other suitable materials. In the preferred embodiment, the shell is manufactured from injected molded plastic. The shells can be manufactured in a variety of colors, designs, and shapes. With the shapes not being limited too specific geometric shapes.

Even though any shape can be used, the preferred way is to take advantage of the unique design and function of housing 10. The first embodiment of the shell design is a sphere shell 170 referred to in FIGS. 11–18.

The sphere shell 170 is divided into a top section 172, a flat base 200, and a bottom section 218 (see FIG. 11). The top section of sphere 172 has a cut out in back 186 and fastening threads 174 at the bottom on the inside of its circumference. The front of top section of sphere 172 has an access door 176 that connects to the bottom of access bay 178 at an access door hinge 180. An access door locking mechanism 182 on top of access bay 178 locks with a plastic extruded piece 184 on access door 176 (see FIGS. 11, 15 and 18).

Bottom section 218 has ventilation holes 220 at its bottom and a raised platform 222. Platform 222 has mounting holes 226 for flat base 200, mounting holes 224 for a fan, and a fastening hole 228 for housing 10 (see FIG. 11).

Flat base 200 has a fan cut out 214 at its middle and has fastening threads 212 at the upper part of its circumference. Flat base 200 has a cut out space 202 for the sliding and securing of housing 10. The flat base 200 has an elevated back 206 that have two extended docking pieces 208 that jut out from its front. Under the two extended docking pieces 208 are two extrusion apertures 210 (see FIGS. 11–13).

Flat base 200 is placed into bottom section of sphere 218 at raised platform 222 (see FIG. 1). Flat base 200 is than secured to platform 222 through flat base holes 204 and platform-mounting holes 224 by platform fasteners 232 (see FIG. 12).

The attachment of housing 10 is the same in all shell embodiments. Rectangular metal bracket 132 of housing 10 is slid over extended docking piece 208 of flat base 200. Than rectangular bracket thumbscrew hole 128 of housing 10 aligns with base panel housing fastening hole 204 of flat base 200 and than secured by a fastener such as a thumbscrew 234. This secures housing 10 to the flat base 200 (see FIGS. 13 and 14).

Top section of sphere 172 is than screwed onto flat base 200, by turning top section of sphere 172 clockwise on flat base 200. This allows top section sphere fastening threads 174 to lock itself in place on flat base fastening threads 212. A removable door 188 is than placed into back panel cut out 186 by inserting connection elements 196 into connection apertures 198, than pushing the top of the removable door forward to where a connection flange 194 will lock into place. The removable door 188 prevents top section of sphere 172 from turning (see FIGS. 15–17).

Due to the shape of the sphere a stand 236 is required. The preferred embodiment of stand 236 is shown in FIG. 12 as having a circular base 238 and with a hollow pin 240 in the middle. It could however take any shape or form that will support the spherical shape. Stand 236 has three curved cut outs 242.

With flat base 200 fastened to bottom section of sphere 218 it is than placed onto the stand 236 by matching up bottom section extruded stand holder 230 with the stands pin 240 (see FIG. 12). It may be easier to put bottom section of sphere 218 onto stand 236 first before installing flat base 200. Once bottom section of sphere 218 and flat base 200 is in place than housing 10 is put in place as was shown in FIG. 14. Top section of sphere 172 is than fastened to flat base 200 (see FIG. 15).

The stand of said computer may be manufactured using cast metal, plastic, wood and other suitable materials. In the preferred embodiment, the shell is manufactured from injected molded plastic. The stand can be manufactured in a variety of colors and shapes.

The pyramid shell 244 is divided into a top section 246 and a base panel 248 (see FIG. 19). The top section of pyramid 246 is made up of four panels, a front panel 268, left and right panels 280L and 280R, and a back panel 288. The back panel 288 of pyramid shell 244 has a cut out 290 to allow for connecting cables to be connected to housing 10. Back panel 288 has thumbscrew holes 292 for connecting to base panel 248 (see FIG. 22).

Figure 20:
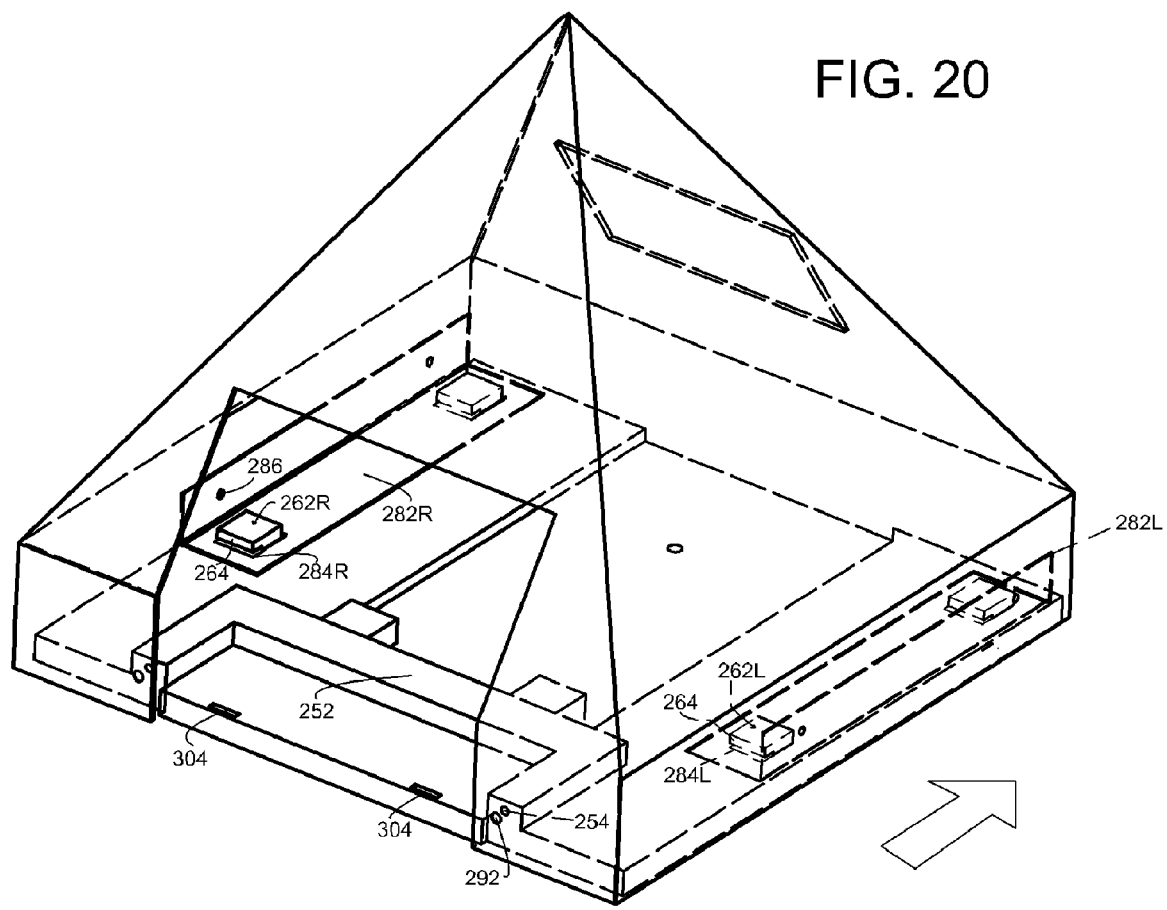
FIG. 20 is a rear inside view of the closed pyramid shell.
Figure 21:
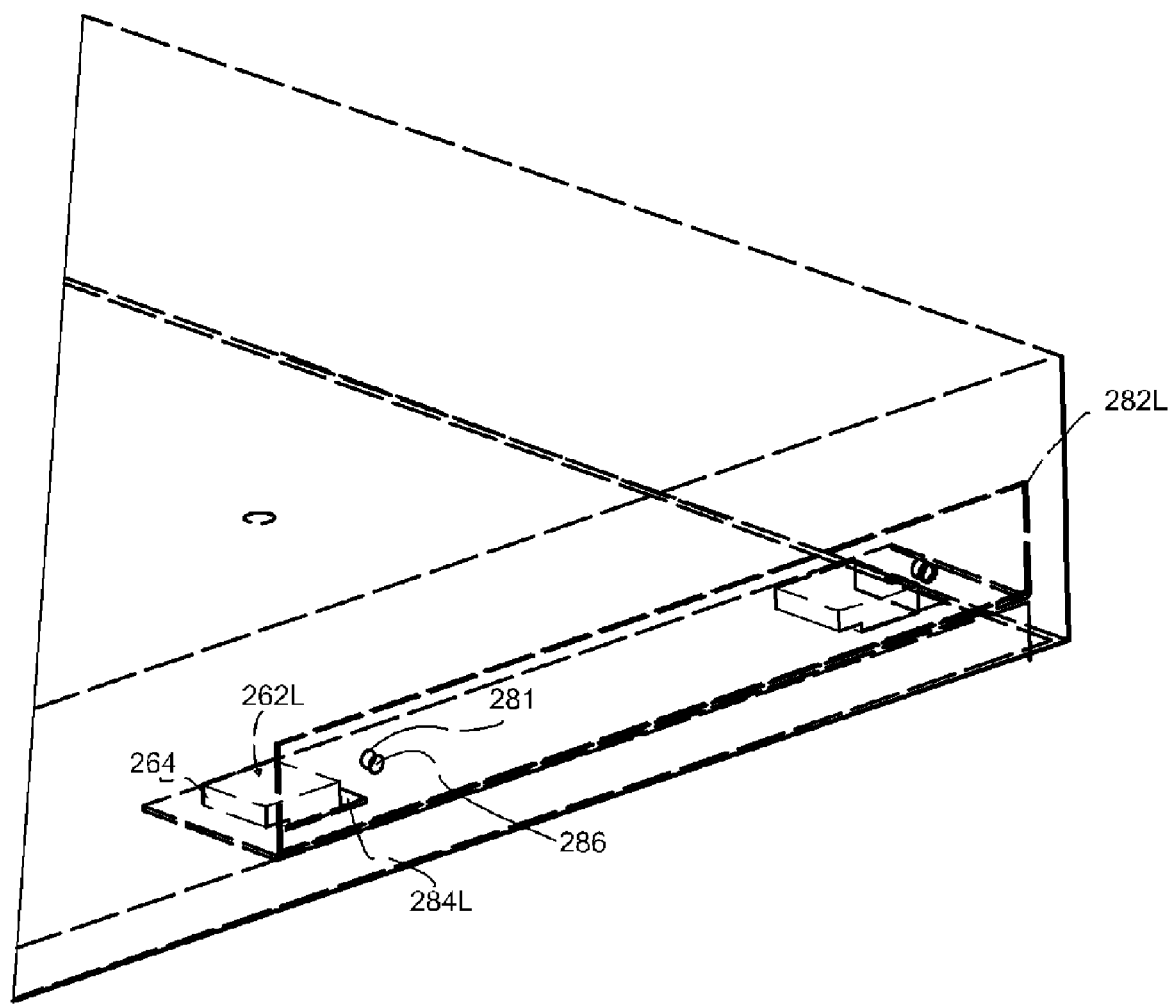
FIG. 21 is a close up view of the closed pyramid shell fastening elements slid into the locked position.
Figure 22:
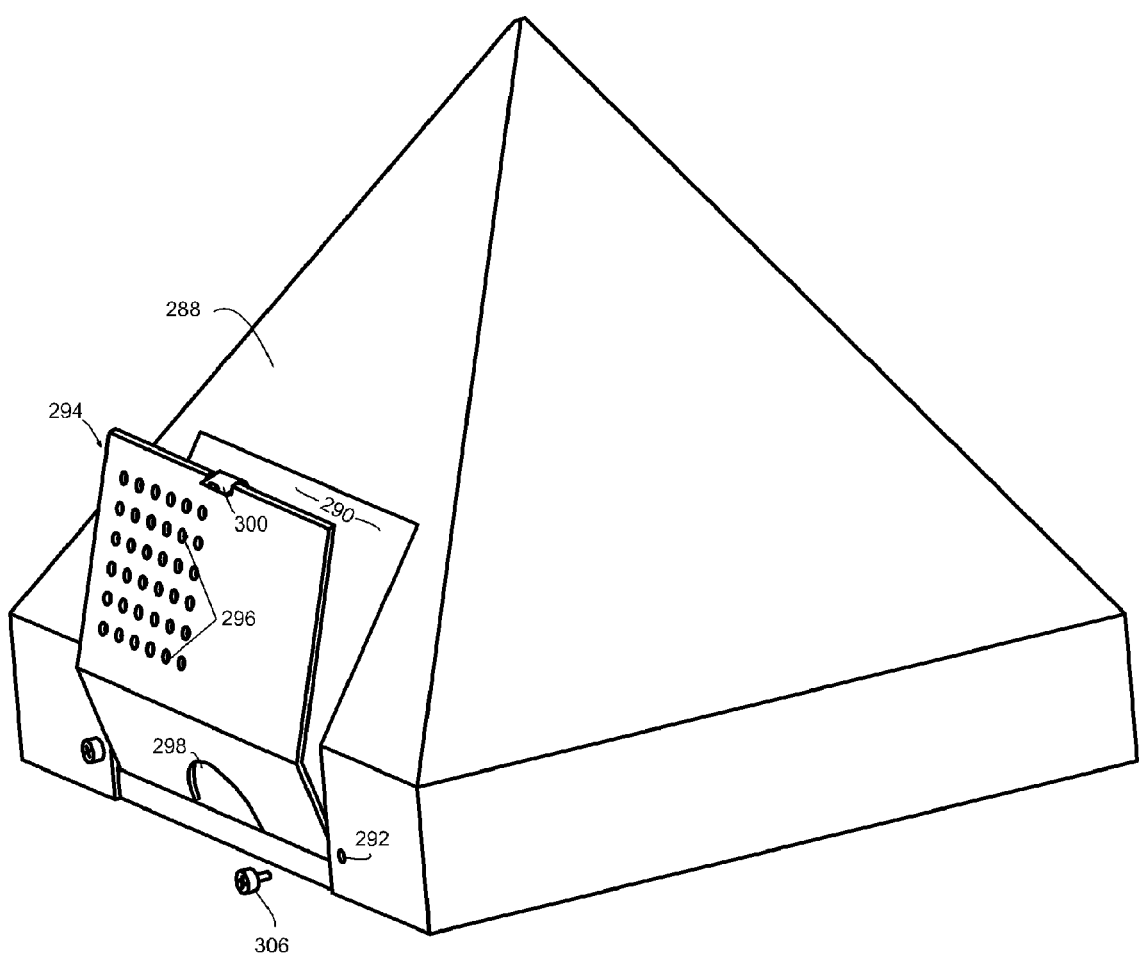
FIG. 22 is a rear view of the pyramid shell with attaching rear panel and fastening thumbscrews.

A set of extension attachments 282L and 282R that extend over base panel 248 are fastened to side panel's 280L and 280R by affixing side panel fastening holes 281 and extension fastening holes 286 with the use of a fastener 62. Each extension has a plurality of shaped apertures 284L and 284R. Along the right and left side of base panel 248 are two sets of projecting posts 262L and 262R. Each base panel projecting post 262L and 262R has an extended edge 264 at its top. Under the extended edges 264 are extrusion apertures 266 (see FIGS. 20 and 21). Base panel 248 has a cut out space 250 for the sliding and securing of housing 10. The base panel 248 has a three-sided elevated back 252 that have two extended docking pieces 256 that jut out from its front. Under the two extended docking pieces 256 are two extrusion apertures 258. The three-sided elevated back 252 has a pair of fastening holes 254 placed along its left and right sides as shown in FIGS. 19 and 20. Base panel housing fastening hole 260 is placed on top of front end of base panel 248 (see FIG. 19).

Front panel 268 has an access door 270 that connects to the bottom of an access bay 272 at access door hinges 274.

Figure 23:
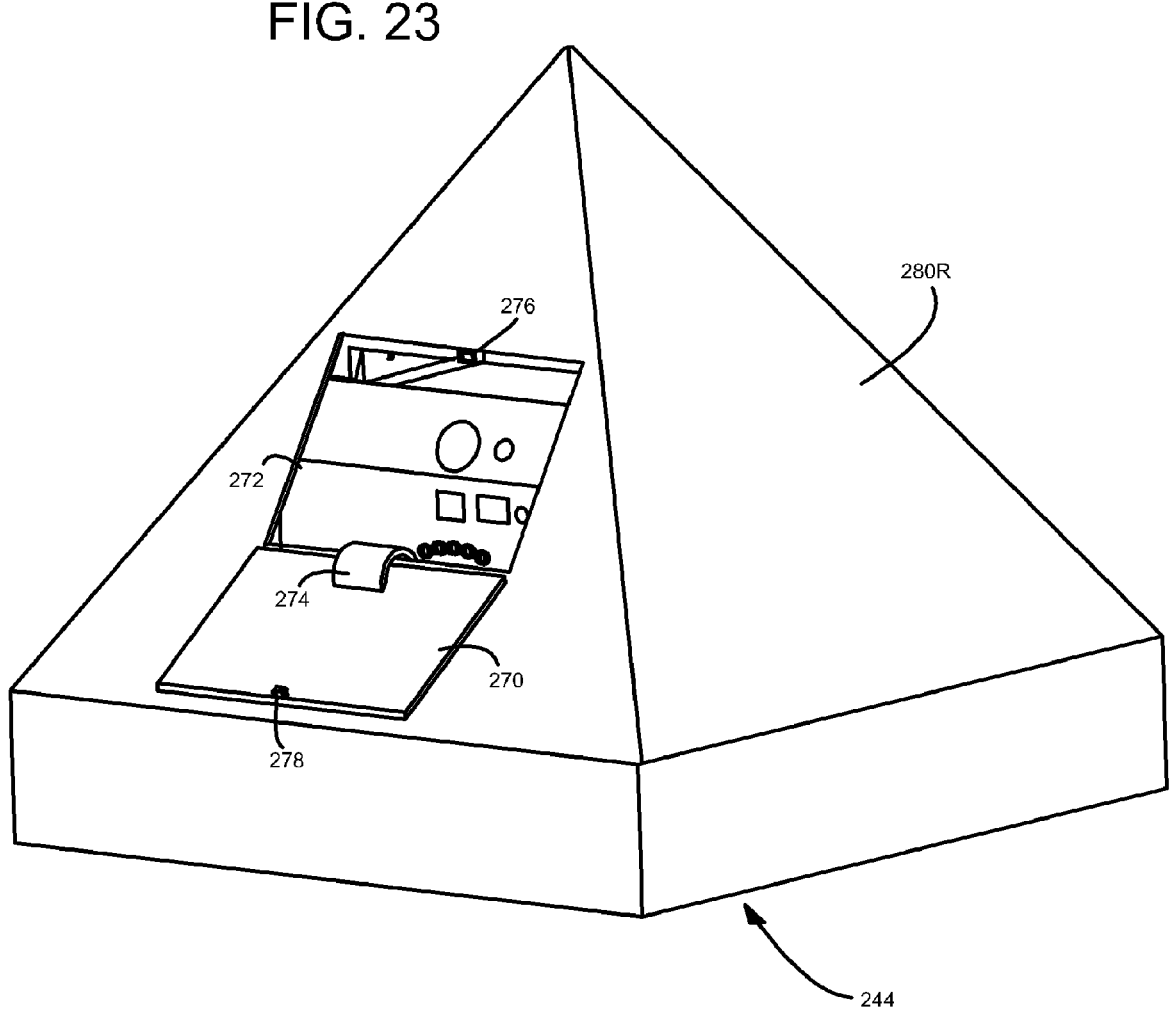
FIG. 23 is a perspective view of an opened hinge door of the pyramid shell.

An access door locking mechanism 276 on top of access bay 272 locks with a plastic extruded piece 278 on access door 270 (see FIG. 23).

Rectangular metal bracket 132 of housing 10 is slid over extended docking piece 256 of base panel 248. Than rectangular bracket thumbscrew hole 128 of housing 10 aligns with base panel housing fastening hole 260 of base panel 248 and than secured by a fastener such as a thumbscrew 306. This locks housing 10 to the base panel 248. Top section of pyramid 246 with apertures 248L and 248R is lowered down over the upwardly projecting posts 262L and 262R of base panel 248. Thereby enabling top section of pyramid 246 to be installed by first a downward motion and than a push or pull forward (see FIGS. 20 and 21). This aligns back panel thumbscrew holes 292 of top section of pyramid 246 with holes 254 of three-sided elevated back 252. Fasteners such as thumbscrews 306 are than added securing the computer together (see FIG. 22). A removable door 294 is than placed into back panel cut out 290 by inserting connection elements 302 into connection apertures 304, than pushing the top of the removable door back to where a connection flange 300 will lock into place. The back removable door has fan ventilation holes 296 and a cable cut out 298.

As one can see the primary difference for this completed computer case over ones in current use is that the outer plastic shell is a separate component. This allows users with a limited computer background to control the look of their computer from colors, shapes and designs easily through a quick standard process. As one can see countless combinations are possible.

REFERENCE NUMERALS

Starting with:
Housing 10
Bottom wall 12
Rear wall 14
Front wall 16
Two opposite lateral side walls 18L and 18R
Two opposite lateral side wall apertures 19L and 19R
Side wall ventilation holes 20
Side wall fan cable aperture 22
Bottom wall hinges 24a, 24b, 24c
Front wall hinge 26a
Two opposite lateral side wall hinges 28b and 28c
Complete formed hinges 30a, 30b, 30c
Hinge pins 32
Motherboard riser holes 34
Rear wall support holes 35
Metal bracket mounting holes 36 and 36'
Front wall ventilation holes 38
Aperture for drive bay 40
Front wall face slits 42
Front wall face flange 44
Front wall top locking mechanism mortises 46
Thumbscrew hole to fasten to rear wall 48
Front wall mounting plate holes 50
Power button aperture 52
Reset button aperture 54
USB port aperture 56
Firewire port aperture 58
Audio port apertures 60
Case screws/Fasteners 62
Slimline Cd-drive bracket 64
Front wall Slimline top plate 66
Slimline bent sides 68

Slimline supports for Hard drive 70
Slimline installation holes 72
Hard drive bracket 74
Hard drive top plate 76
Hard drive bent sides 78
Hard drive tabs 80
Hard drive installation holes 82
Hard drive Mounting plate 84
Hard drive mounting plate fastening holes 86
Hard drive mounting plate power button aperture 88
Hard drive mounting plate reset button aperture 90
Hard drive Slimline fastening flanges 92
Elongated support bracket 94
Elongated support mounting plate 95
Elongated supports 96
Elongated support slits 98
Elongated support fastening holes 100
Motherboard faceplate cut out 102
Expansion card slot 104
Expansion card support 106
Expansion card base aperture 107
Aperture for power supply 108
Power Supply mounting holes 110
Rear Elongated support mounting holes 111
Rear wall flange 112
Rear wall flange thumbscrew hole 114
PCI Cover 116
Rear wall supports 118
Rear wall fastening hole to bottom wall 120
PCI cover aperture 122
Rectangular bracket 124
Rectangular bracket extension 126
Rectangular bracket thumbscrew hole 128
Rectangular bracket mounting holes 130 and 130'
Rectangular bracket 132
Locking mechanism 134
Locking mechanism side wall fastening tabs 136
Locking mechanism flange 138
Top wall 140
Plastic face 142
Plastic face tabs 144
Plastic face ventilation 146
Plastic face drive aperture 148
Plastic face power button cut out 150
Plastic face reset button cut out 152
Plastic face audio port cut outs 154
Plastic face USB port cut out 156
Plastic face firewire port cut out 158
Case thumbscrew 160
Sphere 170
Top section 172
Top section fastening threads 174
Access door 176
Access bay 178
Access door hinge 180
Door locking mechanism 182
Plastic extruded locking piece 184
Top half back cut out 186
Back removable door 188
Back removable door fan ventilation 190
Back removable door cable cut out 192
Back removable door connection flange 194
Back removable door connection elements 196
Base panel door connection element apertures 198
Flat base 200
Flat base cut out space 202
Flat base housing fastening hole 204
Elevated back 206
Extended docking pieces 208
Extended docking apertures 210
Flat base fastening threads 212
Flat base fan cut out 214
Flat base platform mounting holes 216
Bottom section 218
Bottom ventilation holes 220
Raised Platform 222
Platform Extruded Fan mounting holes 224
Platform Extruded flat base mounting holes 226
Extruded fastening hole for housing 228
Extruded stand holder 230
Platform screws 232
Shell thumbscrews 234
Stand 236
Stand base 238
Stand hollow pin 240
Stand cut outs 242
Pyramid 244
Top section 246
Base panel 248
Base panel cut out space 250
Elevated three sided back 252
Elevated three sided back thumbscrew holes 254
Extended docking piece 256
Jut piece apertures 258
Base panel housing fastening hole 260
Base panel projecting posts 262L and 262R
Projecting posts extended edge 264
Base panel extrusion apertures 266
Front panel 268
Access door 270
Access bay 272
Access door hinges 274
Door locking mechanism 276
Plastic extruded locking piece 278
Side panel's 280L and 280R
Side panel extension fastening holes 281
Extension attachments to top half 282L and 282R
Extension attachment apertures 284L and 284R
Extension attachment fastening holes 286
Back panel 288
Back panel cut out 290
Back panel thumbscrew holes 292
Back removable door 294
Back removable door fan ventilation 296
Back removable door cable cut out 298
Back removable door connection flange 300
Back removable door connection elements 302
Base panel connection element apertures 304
Shell thumbscrews 306

What is claimed is:

1. A computer system comprising;
a housing comprising a bottom wall, a front wall, a rear wall, and two opposite lateral side walls;
said two opposite lateral side walls connect in parallel between said front and rear side walls and define a top side wall;
said housing with at least one hinged wall that has an open, folded out position and a closed, folded in position, the hinged wall preventing access to computer components when in the folded in position and permitting access to computer components when in the folded out position, allowing greater access to the computer components;

a locking mechanism for securing said walls to prevent removal of computer components when said housing is in said folded-in position;

a aesthetic outer shell comprising largely a top section and a base panel;

a docking system for removably securing said housing toolessly to said base panel within said aesthetic outer shell;

said top section and said base panel of said aesthetic outer shell carrying respective connection elements that are aligned for enclosing said housing, preventing access to said locking mechanism;

a back door fastened to said aesthetic outer shell and covering said rear wall of the computer housing installed within said outer shell;

said aesthetic outer shell further comprises a hinged door at its front having an open position and a closed position for access to said computer components.

2. The computer according to claim 1, wherein said front wall, rear wall, and said two opposite lateral side walls being in part angled inward.

3. The computer according to claim 1, wherein said hinged walls are said front wall and said two opposite lateral side walls.

4. The computer according to claim 1, wherein said locking mechanism comprises a one-piece member including a mounting portion mounted to the top of front wall, and an actuating portion being elastically flexible relative to the mounting portion.

5. The computer according to claim 4, wherein said actuating portion of said locking mechanism curves upwardly for releasably engaging said opposite lateral side walls of said housing forming said top wall.

6. The computer according to claim 4, wherein force is applied to flex said locking mechanism from a locking position to a release position permitting the actuating portion to flex relative to the mounting portion.

7. The computer according to claim 4, wherein said locking mechanism is made largely of injected molded plastic.

8. The computer according to claim 1, wherein said aesthetic outer shell is largely of a geometric shape.

9. The computer according to claim 7, wherein said aesthetic outer shell is made largely of injected molded plastic.

10. The computer according to claim 1, wherein said housing is slidably assembled and detachable to said docking mechanism by brackets.

11. The computer according to claim 10, wherein said brackets are fastened to the underside of said housing.

12. The computer according to claim 1, wherein said top section connection elements are lowered over said housing and removably assembled to said base panel connection elements.

13. The computer according to claim 10, wherein the said aesthetic outer shell is secured toolessly.

* * * * *